(12) United States Patent
Baldwin

(10) Patent No.: US 10,228,730 B2
(45) Date of Patent: *Mar. 12, 2019

(54) AUTOMATIC SHAPE ADJUSTMENT OF FLEXIBLE DISPLAY

(71) Applicant: AT&T Intellectual Property I, L.P., Atlanta, GA (US)

(72) Inventor: Christopher Baldwin, Crystal Lake, IL (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/460,309

(22) Filed: Mar. 16, 2017

(65) Prior Publication Data

US 2017/0185106 A1 Jun. 29, 2017

Related U.S. Application Data

(63) Continuation of application No. 13/652,555, filed on Oct. 16, 2012, now Pat. No. 9,632,539.

(51) Int. Cl.
*G09G 5/00* (2006.01)
*G06F 3/041* (2006.01)
*G06F 3/045* (2006.01)
*G06F 1/16* (2006.01)
*G06F 3/147* (2006.01)

(52) U.S. Cl.
CPC .......... *G06F 1/1652* (2013.01); *G06F 1/1626* (2013.01); *G06F 1/1684* (2013.01); *G06F 3/147* (2013.01); *G09G 2380/02* (2013.01)

(58) Field of Classification Search
CPC ...................................................... G06F 3/016
See application file for complete search history.

(56) References Cited

U.S. PATENT DOCUMENTS

| | | | |
|---|---|---|---|
| 7,633,491 B2 | 12/2009 | Okamoto | |
| 7,755,605 B2 | 7/2010 | Daniel et al. | |
| 7,782,274 B2 | 8/2010 | Manning | |
| 7,953,462 B2 | 5/2011 | Harry | |
| 2006/0274036 A1 | 12/2006 | Hioki | |
| 2010/0312625 A1 | 12/2010 | Miller et al. | |
| 2011/0084898 A1 | 4/2011 | Ebbeling et al. | |
| 2011/0087977 A1 | 4/2011 | Campney et al. | |
| 2011/0188189 A1 | 8/2011 | Park et al. | |
| 2011/0254838 A1* | 10/2011 | Yun ................... | H04N 13/0048 345/419 |

(Continued)

OTHER PUBLICATIONS

Baeilharz, Kirsty et al., "Expressive Wearable Sonification & Visualisation: Design & Evaluation of a Flexible Display" UTS DAB Lab CB06.50.48, NSW 2007 Australia (et al.); 8 pages.

(Continued)

*Primary Examiner* — Nan-Ying Yang
(74) *Attorney, Agent, or Firm* — Cantor Colburn LLP

(57) ABSTRACT

A device includes a flexible display for displaying media; an actuator for changing a shape of the flexible display; and a processor executing a shape determination application to apply a rule to a shape input to determine a desired shape for the flexible display in response to the shape input; the processor generating a command signal and providing the command signal to the actuator to place the flexible display in the desired shape.

7 Claims, 5 Drawing Sheets

(56) References Cited

U.S. PATENT DOCUMENTS

| | | | |
|---|---|---|---|
| 2011/0304550 A1* | 12/2011 | Romera Jolliff | G06F 3/016 345/168 |
| 2012/0071149 A1 | 3/2012 | Bandyopadhyay | |
| 2012/0105333 A1 | 5/2012 | Maschmeyer et al. | |
| 2012/0112994 A1 | 5/2012 | Vertegaal et al. | |
| 2012/0256963 A1* | 10/2012 | Suzuki | G06F 3/0416 345/661 |
| 2012/0313862 A1 | 12/2012 | Ko et al. | |
| 2013/0082924 A1 | 4/2013 | Kumar et al. | |
| 2014/0104244 A1 | 4/2014 | Baldwin | |

OTHER PUBLICATIONS

Coelho, Marcelo et al., "Shape-changin interfaces", Pers Ubiquit Comput (2011) 15: pp. 161-173.

Coelho, Marcelo et al., "Surflex: A Programmable Surface for the Design of Tangible Interfaces", CHI 2008, Apr. 5-Apr. 10, Florence Italy, 6 pages.

Final Office action for U.S. Appl. No. 13/652,555, dated Jul. 27, 2015, 16pgs.

Final Office Action U.S. Appl. No. 13/652,555, dated Dec. 12, 2014.

Hruska, Joel, "Samsung at CES" Flexible displays, low-power LCDs, and all-new CPU designs, http://www.extremetech.com/computing/145284-samsung-at-ces-flexible-displays-low-power-lcds-and-all-new-cpu-designs, Jan. 9, 2013, 6 pages.

Lowensohn, Josh, "Eyes-on: Samsung's Youm flexible-display tech at CES 2013", http://ces.cnet.com/8301-34435_1-57563058/eyes-on-samsungs-youm-flexible-display-tech-at-ces-2013/, Jan. 9, 2013, 4 pages.

Non Final Office Action U.S. Appl. No. 13/652,555, dated Apr. 2, 2105.

Non-Final Office Action, U.S. Appl. No. 13/652,555, dated Jan. 13, 2016.

Non-Final Office Action, U.S. Appl. No. 13/652,555, dated Aug. 19, 2014.

Notice of Allowance for U.S. Appl. No. 13/652,555, dated Dec. 21, 2016, 10 pgs.

PC Tablet article, "Samsung Galaxy S4 may feature the Flexible Display Youm showed off at CES 2013", http://www.pc-tablet.com/15232-samsung-galaxy-s4-feature-flexible-display-youm-showed-ces-20131, Jan. 16, 2013, 3 pages.

Rodriguez, Salvador, "CES 2013: Samsung shows off flexible, unbreakable smartphone screens", http://www.latimes.com/business/technology/la-fi-tn-ces-samsung-flexible-oled-display-20130110,0,5524272.story, Jan. 10, 2013, 3 pages.

\* cited by examiner

AUTOMATIC SHAPE ADJUSTMENT OF FLEXIBLE DISPLAY

CROSS-REFERENCE TO RELATED APPLICATIONS

This application is a continuation of U.S. patent application Ser. No. 13/652,555, filed Oct. 16, 2012, the entire contents of which are incorporated herein by reference.

BACKGROUND

The present disclosure relates generally to flexible displays, and more particularly, to methods, systems, and computer program products for automatic shape adjustment of a flexible display.

A developing technology in the wireless device space is the use of flexible displays. Flexible displays are device screens that can be bent and flexed without damaging the internal components. Current designs allow for bending and twisting of a screen in order to provide an input or command to a device. Other techniques for controlling the shape of a flexible display include preset commands that dictate a specific shape for the display. The existing techniques for controlling the shape of a flexible display use predetermined commands and predetermined display shapes.

BRIEF SUMMARY

Exemplary embodiments include a device including a flexible display for displaying media; an actuator for changing a shape of the flexible display; and a processor executing a shape determination application to apply a rule to a shape input to determine a desired shape for the flexible display in response to the shape input; the processor generating a command signal and providing the command signal to the actuator to place the flexible display in the desired shape.

Other exemplary embodiments include a method to control a shape of a flexible display, the method including obtaining a shape input for the flexible display; executing a shape determination application to apply a rule to the shape input to determine a desired shape for the flexible display in response to the shape input; and generating a command signal and providing the command signal to an actuator to place the flexible display in the desired shape.

Other exemplary embodiments include a computer program product embodied on a tangible computer readable storage medium, the computer program product including instructions for causing a processor to execute a method, including obtaining a shape input for the flexible display; executing a shape determination application to apply a rule to the shape input to determine a desired shape for the flexible display in response to the shape input; and generating a command signal and providing the command signal to an actuator to place the flexible display in the desired shape.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The detailed description explains the exemplary embodiments, together with advantages and features, by way of example with reference to the drawings.

DETAILED DESCRIPTION OF EXEMPLARY EMBODIMENTS

Figure 1:
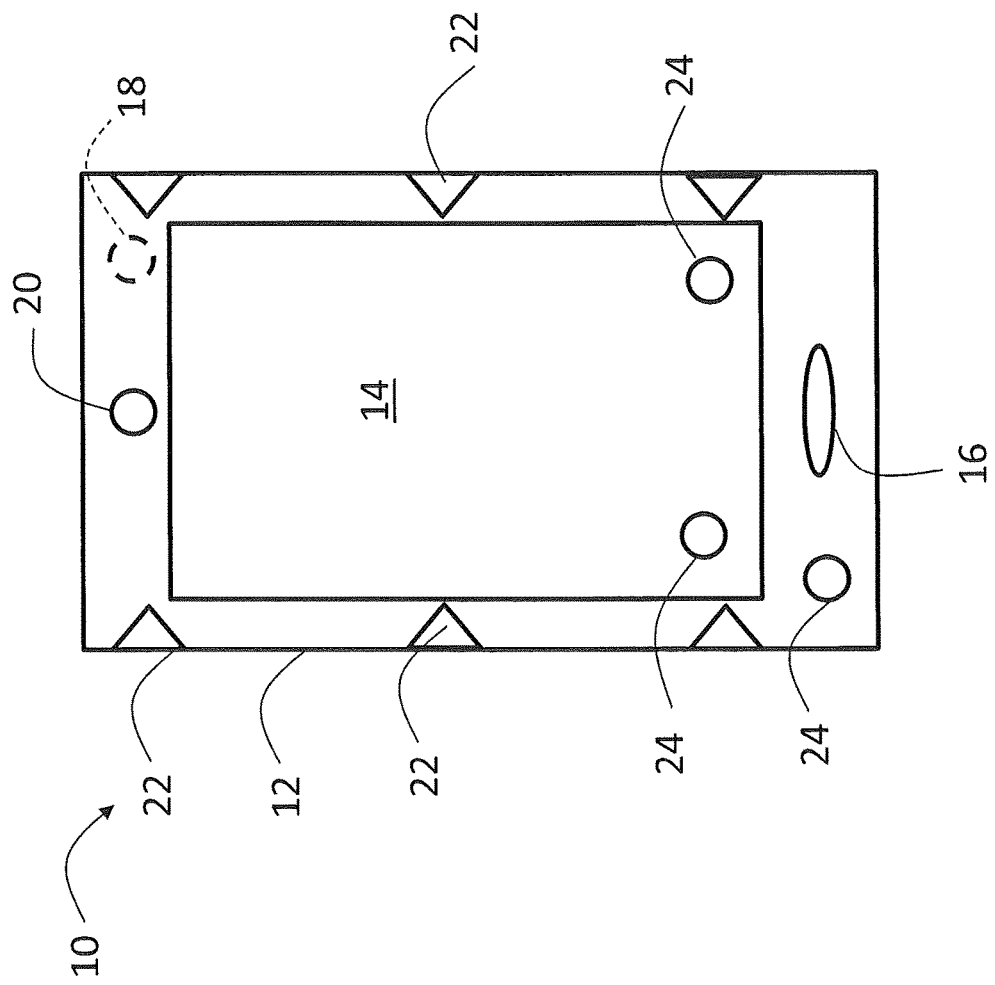
FIG. 1 depicts a mobile device with a flexible display in an exemplary embodiment.

FIG. 1 depicts a mobile device 10 with a flexible display in an exemplary embodiment. Mobile device 10 may be a phone, tablet, personal digital assistant, etc., equipped with communications components (e.g., cellular, wifi, NFC, Bluetooth) for communicating over wireless or wired networks. Mobile device 10 includes a housing 12 that supports flexible display 14. Flexible display 14 may be any known type of flexible display such as a flexible organic light emitting diode (OLED) display of flexible liquid crystal diode (LCD) display.

Mobile device 10 includes a microphone 16. Microphone 16 is used for voice communications and for receiving spoken commands from a user. A camera 18 may be located on a back side of housing 12. Camera 18 receives gesture commands from a user to control the flexible display 14. Camera 18 may also serve as a light sensor to control flexible display 14. A speaker 20 provides audio output to the user. Mobile device 10 also includes one or more buttons 24 for controlling the device. Buttons 24 may be permanent components built into housing 12 or may be virtual buttons, presented on display 14, activated by touching display 14. One or more sensors 22 are positioned on housing 12 to sense various parameters such as contact, temperature, motion, etc.

Figure 2:
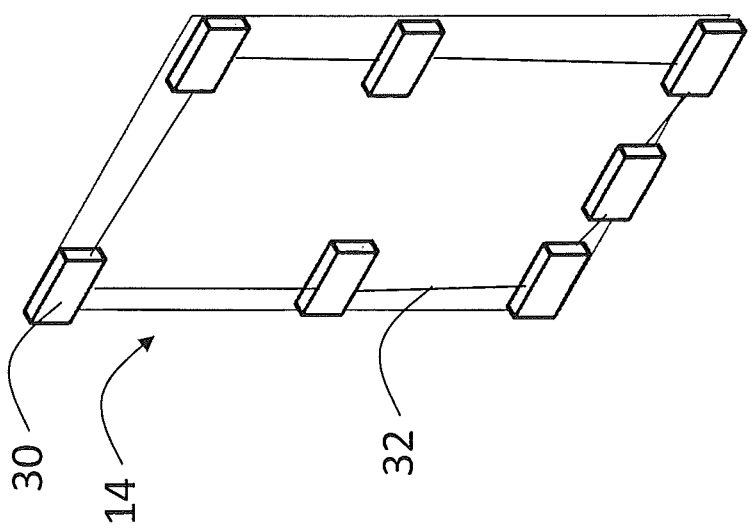
FIG. 2 depicts a flexible display in an exemplary embodiment.

FIG. 2 depicts a flexible display 14 in an exemplary embodiment. A plurality of actuators 30 are positioned on a back side of display 14. The actuators 30 may be implemented using known force transmitting devices (e.g., electromagnetic, pneumatic, hydraulic, electromechanical, etc.). The actuators 30 operate to adjust shape and/or size of display 14, in response to commands from a processor, as described in further detail herein. In exemplary embodiments, actuators 30 include muscle wires, which change shape when the appropriate electrical current is applied. A variety of three-dimensional shapes may be assumed by display 14. Actuators 30 may be interconnected by links 32 (e.g. wires, pins, etc.) to provide support for display shapes. Since the arrangement of the actuators 30 is known, the necessary signals required to create a desired display shape can be calculated by a processor.

Figure 3:
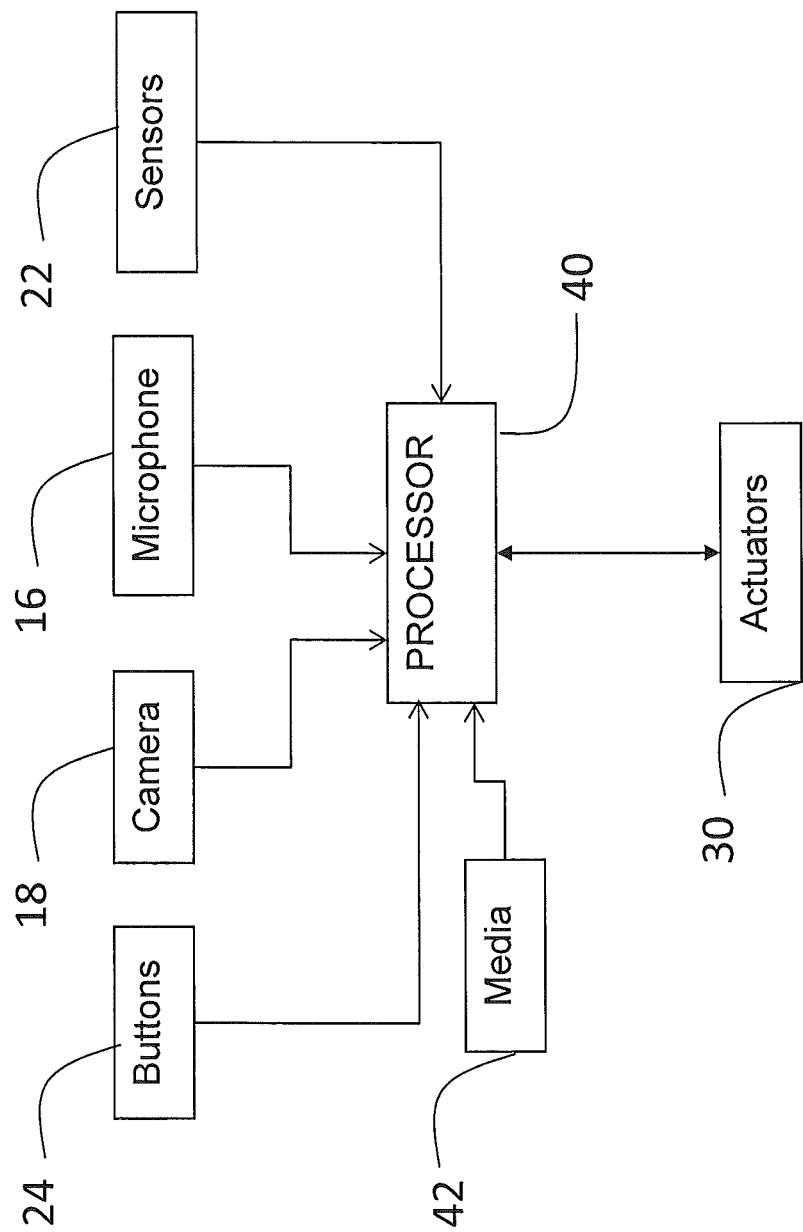
FIG. 3 depicts a system for controlling a flexible display in an exemplary embodiment.

FIG. 3 depicts a system for controlling a flexible display in an exemplary embodiment. A processor 40 is coupled to buttons 24, camera 18, microphone 16, and sensors 22 to determine if a change of shape of display 14 is commanded. Processor 40 may be implemented using a general-purpose microprocessor executing a computer program stored in a computer readable storage medium to execute the processes described herein. Processor 40 also receives at least a portion of media 42 to be displayed on display 14. Processor 40 can interpret the media 42 to determine a shape for display 14 as described in further detail herein. Processor 40 also receives status signals from actuators 30 identifying a current position of display 14. Based on the various inputs, processor 40 generates command signals to actuators 30 to change the shape of display 14.

Figure 4:
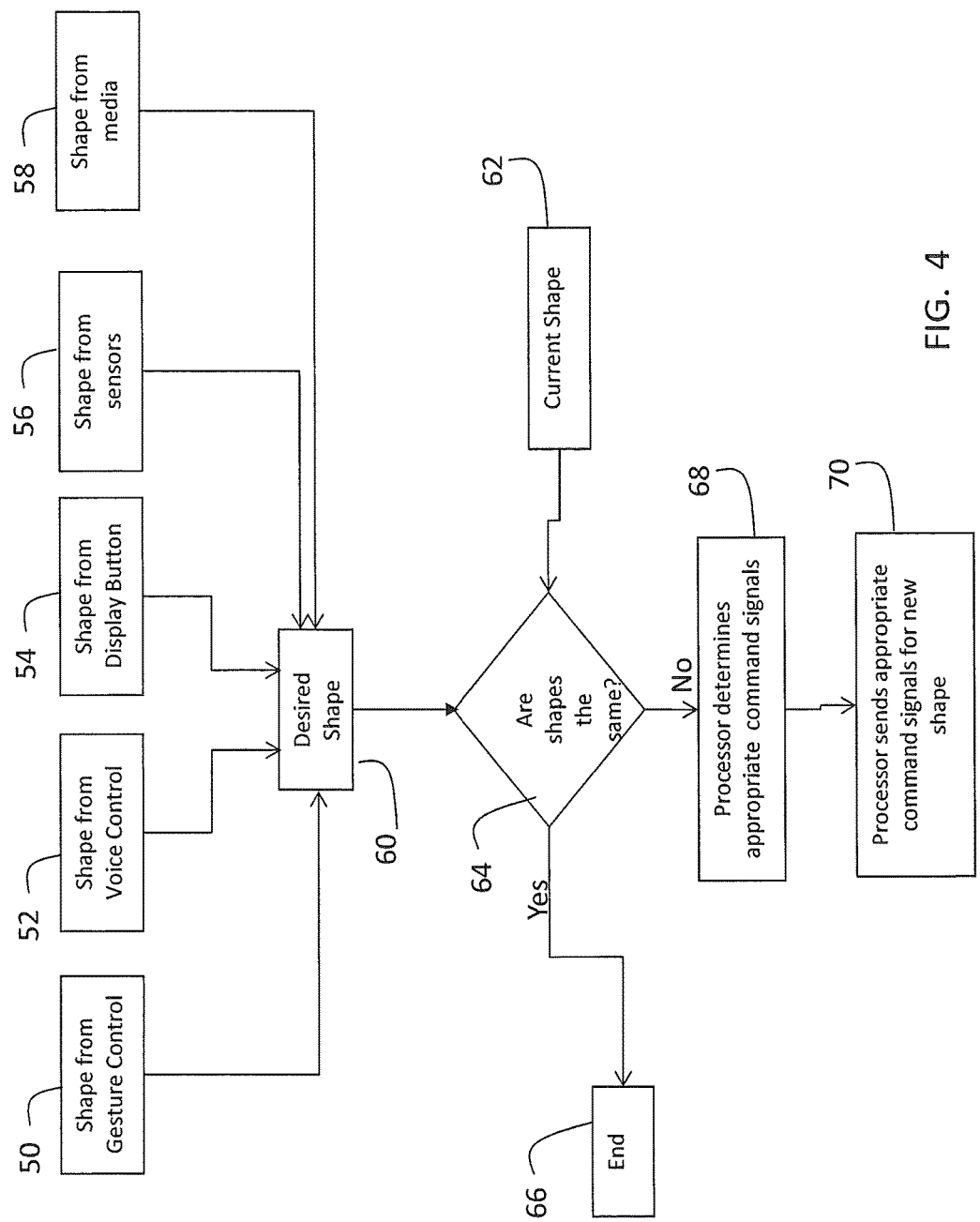
FIG. 4 is a flowchart of a process for controlling display shape in an exemplary embodiment.

FIG. 4 is a flowchart of a process for controlling display shape in an exemplary embodiment. Processor 40 receives a shape input from one or more sources, such as a shape input from a user gesture at block 50. The user gesture may be captured by camera 18. For example, a user moving two fingers toward or away from each other could signal the desire to bring the edges of the display 14 closer or farther apart. Processor 40 may receive shape input from a voice input at block 52. The voice input may be captured by microphone 16. Processor 40 may receive shape input from a button 24 at block 54. Buttons 24 may be configured to increase or decrease display size or command a certain shape. Processor 40 may receive shape input from sensors 22 at block 56. Sensors 22 may detect how device 10 is being held in one's hand (e.g., via contact sensors) which would result in processor 40 adjusting display 14 in response to contact with the device 10. Sensors 22 may also provide helpful input in determining whether a shape can be assumed by display 14. For example, if a user commands a shape inadvertently, sensors 22 may indicate that the shape cannot be currently assumed because device 10 is in an enclosed space (e.g., a user's pocket or purse) based on light, contact, and/or heat sensors. Thus, the shape input from sensors 22 can override other shape inputs from different inputs. Camera 18 and/or microphone 16 may also be used to provide information about whether a shape can be assumed.

Processor 40 may receive shape input from media 42 at block 58, either prior to or during presentation of the media on display 14. Processor 40 may examine the media to determine a format of the media and a corresponding display shape. For example, if the media is an incoming voice call, then the display may be kept relatively small. By contrast, if the media is an incoming video conference, the display 14 may be enlarged and tilted towards the user. Detection of the media by processor 40 may be based on file extensions (e.g., mpeg, txt, pdf, avi) or based on an operational mode of the device (e.g., placing a call, incoming call, playing movie, browsing internet).

Figure 5:
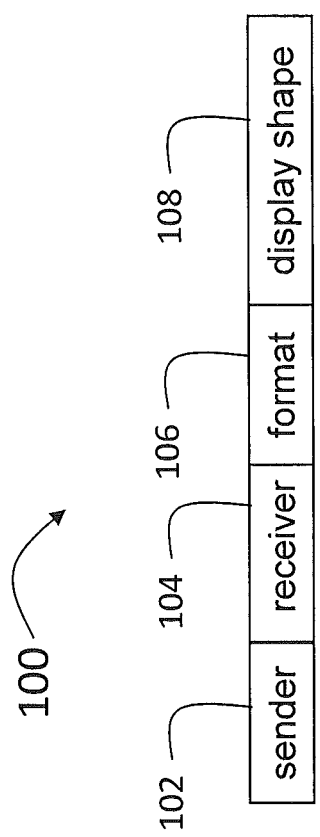
FIG. 5 depicts encoding a shape input in media in an exemplary embodiment.

In alternate embodiments, the media includes a header that includes a shape input field for controlling a shape of display 14. FIG. 5 depicts an exemplary header 100 for a media file. The header 100 may accompany a media file sent by a sending device and be generated by the sending device. Header 100 may include a sender field 102 and receiver field 104 identifying addresses for each party. Further, a format field 106 may identify the type of media (e.g., txt, pdf, mpeg, etc.). A display shape field 108 includes a shape input that is used by processor 40 to control the shape of display 14. For example, the media may be an e-card wishing the receiving party a happy birthday. The display shape field 108 may include shape input to cause processor 40 to configure the display 14 as cube, to display a three dimensional cake. Through the display shape field 108, a sender of media can also provide a shape input to control the shape of flexible display 14.

In alternate embodiments, processor 40 may derive a shape input from the media itself, rather than relying on a file extension or header. Processor 40 may examine the media itself and determine a desired shape from the media contents. For example, processor 40 may detect certain keywords in a text message that initiate a desired shape. Alternatively, musical content may be processed to derive a desired shape by, for example, extracting a vector of attributes of the music and determining a desired shape from the attributes of the media. Thus, the media itself may serve as a shape input.

In further alternate embodiments, the shape input may be directly commanded from an external communication, rather than derived from media received at device 10. For example, a group of users may be meeting at a certain time, but have not decided a place to meet. One user can send a communication (e.g., an SMS message) to the other user devices, the communication including a shape input that causes the display 14 to assume a shape of a familiar landmark (e.g., St. Louis Arch) where the group should meet. In such embodiments, the shape input is the content received at mobile device 10.

Referring to FIG. 4, at block 60 the processor 40 receives the various shape inputs and executes a shape determination application to determine a desired shape for display 14. The goal of the shape determination application is to determine the desired shape for display 14 by applying rules to the shape inputs. For example, the shape inputs may have different priorities, such that a higher shape input priority would take precedence over a lower priority shape input in the event of a conflict. For example, the shape input from buttons 24 may have the highest priority as these inputs are often directly from the user. For example, even if the media shape input identifies an oversized display, the user may override the media shape input using buttons 24. Similarly, shape input from sensors 22 may indicate that the display 14 should not be reshaped, as it is sensed that the device 10 is in an enclosed space (e.g., pocket, purse, desk drawer).

Once the desired shape for display 14 is determined, the desired shape is compared to a current shape 62 at block 64. The current shape is known by processor 40 based on the state of actuators 30. Processor 40 can poll actuators 30 to determine if the display shape has been changed, for example, by the user physically. If the desired shape and current shape match, then no shape change is needed and the process ends at block 66.

If the desired shape and current shape do not match, then flow proceeds to block 68 where processor 40 determines appropriate command signals to transition the display 14 from the current shape to the desired shape. At block 70, the command signals from processor 40 are applied to actuators 30 to place display 14 in the desired shape.

The changes in shape of display 14 may include a wide variety of deformations, including stretching to permit any bending or twisting. Such deformations enable a display in a small mobile device (such as a smartphone) to expand to many times its original size. This expanded display may be capable of folding. Such an expanded folded display may permit multiple users that are facing each other to see the same content simultaneously on the same device, or to operate independent user interfaces on the same display on the same device.

As described above, the exemplary embodiments can be in the form of processor-implemented processes and devices for practicing those processes, such as processor 40. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes a device for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc., do not denote any order or importance, but rather the terms first, second, etc., are used to distinguish one element from another. Furthermore, the use of the terms a, an, etc., do not denote a limitation of quantity, but rather denote the presence of at least one of the referenced item.

What is claimed is:

1. A device comprising:
    a flexible display to display media;
    an actuator to change a shape of the flexible display; and
    a processor to execute a shape determination application to apply a rule to a shape input to determine a desired shape for the flexible display in response to the shape input; and
    the processor to generate a command signal and to provide the command signal to the actuator to place the flexible display in the desired shape;
    wherein the shape input is derived from the media, the shape input identified in a display shape field contained in a header accompanying the media received by the device, the processor using the display shape field contained in the header to generate the command signal to place the flexible display in the desired shape;
    wherein the shape input includes a plurality of shape inputs from a plurality of sources, the shape determination application to determine the desired shape in response to the plurality of shape inputs;
    the processor to assign priorities to the plurality of shape inputs, a high priority shape input to be selected by the shape determination application to generate the command signal.

2. The device of claim 1 further comprising:
    a sensor generating a sensor shape input;
    the processor using the sensor shape input to determine an ability to place the flexible display in the desired shape.

3. A method to control a shape of a flexible display, the method comprising:
    receiving media at a device having the flexible display;
    obtaining a shape input for the flexible display;
    executing a shape determination application to apply a rule to the shape input to determine a desired shape for the flexible display in response to the shape input;
    generating a command signal and providing the command signal to the actuator to place the flexible display in the desired shape;
    wherein the obtaining the shape input includes deriving the shape input from the media displayed on the flexible display, wherein deriving the shape input from the media displayed on the flexible display includes identifying a display shape field contained in a header accompanying the media received by the device and using the display shape field contained in the header to generate the command signal to place the flexible display in the desired shape;
    wherein the shape input includes a plurality of shape inputs from a plurality of sources, the shape determination application determining the desired shape in response to the plurality of shape inputs;
    the shape determination application assigning priorities to the plurality of shape inputs, a high priority shape input being selected by the shape determination application for generating the command signal.

4. The method of claim 3 further comprising:
    obtaining a sensor shape input from a sensor;
    using the sensor shape input to determine an ability to place the flexible display in the desired shape.

5. A computer program product embodied on a non-transitory computer readable storage medium, the computer program product including instructions for causing a processor to execute operations comprising:
    receiving media at a device having the flexible display;
    obtaining a shape input for a flexible display;
    executing a shape determination application to apply a rule to the shape input to determine a desired shape for the flexible display in response to the shape input;
    generating a command signal and providing the command signal to the actuator to place the flexible display in the desired shape;
    wherein the obtaining the shape input includes deriving the shape input from media displayed on the flexible display, wherein deriving the shape input from the media displayed on the flexible display includes identifying a display shape field contained in a header accompanying the media received by the device and using the display shape field contained in the header to generate the command signal to place the flexible display in the desired shape;
    wherein the shape input includes a plurality of shape inputs from a plurality of sources, the shape determination application determining the desired shape in response to the plurality of shape inputs;
    the shape determination application assigning priorities to the plurality of shape inputs, a high priority shape input being selected by the shape determination application for generating the command signal.

6. The computer program product of claim 5, the operations further comprising:
    obtaining a sensor shape input from a sensor,
    using the sensor shape input to determine an ability to place the flexible display in the desired shape.

7. The device of claim 1 wherein:
    the actuator is configured to fold the flexible display.

* * * * *